(12) United States Patent
Sugaya

(10) Patent No.: US 10,235,525 B2
(45) Date of Patent: Mar. 19, 2019

(54) APPLICATION PROVIDING SERVER, APPLICATION SETTING TERMINAL, APPLICATION PROVIDING SYSTEM, METHOD OF PROVIDING APPLICATION, AND PROGRAM FOR APPLICATION PROVIDING SERVER

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 355 days.

(21) Appl. No.: 15/042,258

(22) Filed: Feb. 12, 2016

(65) Prior Publication Data

US 2016/0381187 A1 Dec. 29, 2016

(30) Foreign Application Priority Data

Jun. 26, 2015 (JP) ................. 2015-128392

(51) Int. Cl.
| | |
|---|---|
| *G06F 15/173* | (2006.01) |
| *G06F 21/57* | (2013.01) |
| *H04W 4/60* | (2018.01) |
| *H04L 29/08* | (2006.01) |

(52) U.S. Cl.
CPC .............. *G06F 21/57* (2013.01); *H04W 4/60* (2018.02); *H04L 67/34* (2013.01)

(58) Field of Classification Search
CPC .......... H04L 69/03; H04L 67/10; H04L 63/20
USPC ............................................... 709/223; 726/1
See application file for complete search history.

(56) References Cited

U.S. PATENT DOCUMENTS

| | | | | |
|---|---|---|---|---|
| 2013/0205366 A1* | 8/2013 | Luna | ..................... | H04L 63/101 726/1 |
| 2014/0007048 A1* | 1/2014 | Qureshi | ................... | G06F 21/10 717/110 |
| 2014/0033271 A1* | 1/2014 | Barton | ..................... | H04L 67/10 726/1 |
| 2014/0109176 A1* | 4/2014 | Barton | ................ | G06F 9/45533 726/1 |
| 2014/0366160 A1* | 12/2014 | Cohen | ..................... | G06F 21/12 726/28 |

FOREIGN PATENT DOCUMENTS

JP 2012-069087 4/2012

* cited by examiner

*Primary Examiner* — Frantz B Jean
(74) *Attorney, Agent, or Firm* — Lex IP Meister, PLLC

(57) ABSTRACT

The present invention is to provide an application providing server, an application setting terminal, an application providing system, a method of providing an application, and a program for an application providing server, which easily provide an application in accordance with a policy. The application providing server 10 transmitting an application to an application setting terminal 100 previously stores a policy to judge whether or not to provide an application, for each ID; displays only an application conformable to the policy and transmittable to the application setting terminal 100, in response to access from an application setting terminal 100 belonging to the ID; and transmits an application selected from the displayed transmittable application by the application setting terminal 100 to the application setting terminal 100.

6 Claims, 11 Drawing Sheets

Fig. 6

POLICY TABLE

| ID | POLICY |
|---|---|
| XXXX | Access is denied to external servers other than specified external servers. |

Fig. 7

WHITELIST TABLE

| APPLICATION | ID |
|---|---|
| B | XXXX |
| C | XXXX |

Fig. 8

BLACKLIST TABLE

| APPLICATION | ID |
|---|---|
| A | XXXX |

APPLICATION PROVIDING SERVER, APPLICATION SETTING TERMINAL, APPLICATION PROVIDING SYSTEM, METHOD OF PROVIDING APPLICATION, AND PROGRAM FOR APPLICATION PROVIDING SERVER

CROSS REFERENCE TO RELATED APPLICATIONS

This application claims priority to Japanese Patent Application No. 2015-128392 filed on Jun. 26, 2015, the entire contents of which are incorporated by reference herein.

TECHNICAL FIELD

The present invention relates to an application providing server providing an application, an application setting terminal communicatively connected with an application providing server, an application providing system, a method of providing an application, and a program for an application providing server.

BACKGROUND ART

Recently, servers have provide applications through web pages on the Internet, etc., to install applications in sophisticated mobile terminals such as smart phones and tablet terminals. In such servers, downloadable applications are previously registered.

Moreover, a web service providing system is disclosed, in which an user ID identifying a user is associated and managed with an attribute and in which data associated with a security policy is acquired based on a specific security policy (for example, refer to Patent Document 1).

CITATION LIST

Patent Literature

Patent Document 1: JP 2012-69087 A

SUMMARY OF INVENTION

According to Patent Document 1, when providing web services, the system associates and stores an user ID with an attribute and associates and manages this attribute with a security policy. User's personal information data can be acquired from an in-house data service based on this security policy.

The method described in Patent Document 1 can restrict the acquisition of personal data for each user when providing services. However, when providing an application, the method hardly enough restricts the acquisition by restricting the installation of an application, for example, by allowing only a specific user to download an application and previously creating a blacklist to restrict the download of a specific application because new applications are released every day. Especially, if applications are executed only in a terminal through in-house server access, the installation of applications can be encouraged. However, access to an outside server may be avoided.

Therefore, the present invention focuses on the solution that easily provides an application in accordance with a policy by putting an application in a blacklist when a behavior that does not conform to a policy is detected.

An objective of the present invention is to provide an application providing server, an application setting terminal, an application providing system, a method of providing an application, and a program for an application providing server, which easily provide an application in accordance with a policy.

According to the first aspect of the present invention, an application providing server transmitting an application to an application setting terminal includes:

a policy storing unit that previously stores a policy to judge whether or not to provide an application, for each ID;

an application providing display unit that displays only an application conformable to the policy and transmittable to the application setting terminal, in response to access from an application setting terminal belonging to the ID; and an application transmitting unit that transmits an application selected from the displayed transmittable application by the application setting terminal to the application setting terminal.

According to the first aspect of the present invention, an application providing server transmitting an application to an application setting terminal previously stores a policy to judge whether or not to provide an application, for each ID; displays only an application conformable to the policy and transmittable to the application setting terminal, in response to access from an application setting terminal belonging to the ID; and transmits an application selected from the displayed transmittable application by the application setting terminal to the application setting terminal.

The first aspect of the present invention is the category of an application providing server, but the categories of an application providing system, a method of providing an application, and a program for an application providing server have the same functions and effects.

According to the second aspect of the present invention, an application setting terminal communicatively connected with the application providing server according to the first aspect of the present invention includes:

an application setting unit that receives and sets an application from the application providing server;

a policy judgment unit that judges whether or not the set application behaves in conformance to the policy; and a notification unit that notifies the application providing server that the application is not conformed if the policy judgment unit judges that the set application does not behave in conformance to the policy.

According to the second aspect of the present invention, an application setting terminal communicatively connected with the application providing server according to the first aspect of the present invention receives and sets an application from the application providing server; judges whether or not the set application behaves in conformance to the policy; and notifies the application providing server that the application is not conformed if judging that the set application does not behave in conformance to the policy.

According to the third aspect of the present invention, in the application setting terminal according to the second aspect of the present invention, the policy judgment unit judges whether or not the set application behaves in conformance to the policy by detecting that the application accesses an outside server based on a policy whether or not the application accesses an outside server.

According to the third aspect of the present invention, the application setting terminal according to the second aspect of the present invention judges whether or not the set application behaves in conformance to the policy by detecting that the application accesses an outside server based on a policy whether or not the application accesses an outside server.

According to the fourth aspect of the present invention, an application providing system includes an application setting terminal and an application providing server, the application providing server being communicatively connected with the application setting terminal and transmitting an application to the application setting terminal, in which the application providing server includes:
a policy storing unit that previously stores a policy to judge whether or not to provide an application, for each ID;
an application providing display unit that displays only an application conformable to the policy to transmit to the application setting terminal in response to access from an application setting terminal belonging to the ID; and
an application transmitting unit that transmits an application selected from the displayed transmittable application by the application setting terminal to the application setting terminal, and the application setting terminal includes:
an application setting unit that receives and sets an application from the application providing server;
a policy judgment unit that judges whether or not the set application behaves in conformance to the policy; and
a notification unit that notifies the application providing server that the application is not conformed if the policy judgment unit judges that the set application does not behave in conformance to the policy.

According to the fifth aspect of the present invention, a method of transmitting an application to an application setting terminal includes the steps of:
previously storing a policy to judge whether or not to provide an application, for each ID;
displaying only an application conformable to the policy to transmit to the application setting terminal in response to access from an application setting terminal belonging to the ID; and
transmitting an application selected from the displayed transmittable application by the application setting terminal to the application setting terminal.

According to the sixth aspect of the present invention, a computer program product for use in an application providing server transmitting an application to an application setting terminal includes a non-transitory computer usable medium having a set of instructions physically embodied therein, the set of instructions including computer readable program code, which when executed by the application providing server causes the information processing unit to:
previously store a policy to judge whether or not to provide an application, for each ID;
display only an application conformable to the policy to transmit to the application setting terminal in response to access from an application setting terminal belonging to the ID; and
transmit an application selected from the displayed transmittable application by the application setting terminal to the application setting terminal.

The present invention can provide an application providing server, an application setting terminal, an application providing system, a method of providing an application, and a program for an application providing server, which easily provide an application in accordance with a policy.

BRIEF DESCRIPTION OF DRAWINGS

FIG. 6 shows a policy table stored by the application providing server 10.

FIG. 7 shows a whitelist table stored by the application providing server 10.

FIG. 8 shows a blacklist table stored by the application providing server 10.

DESCRIPTION OF EMBODIMENTS

Embodiments of the present invention will be described below with reference to the attached drawings. However, this is illustrative only, and the technological scope of the present invention is not limited thereto.

Overview of Application Providing System 1

Figure 1:
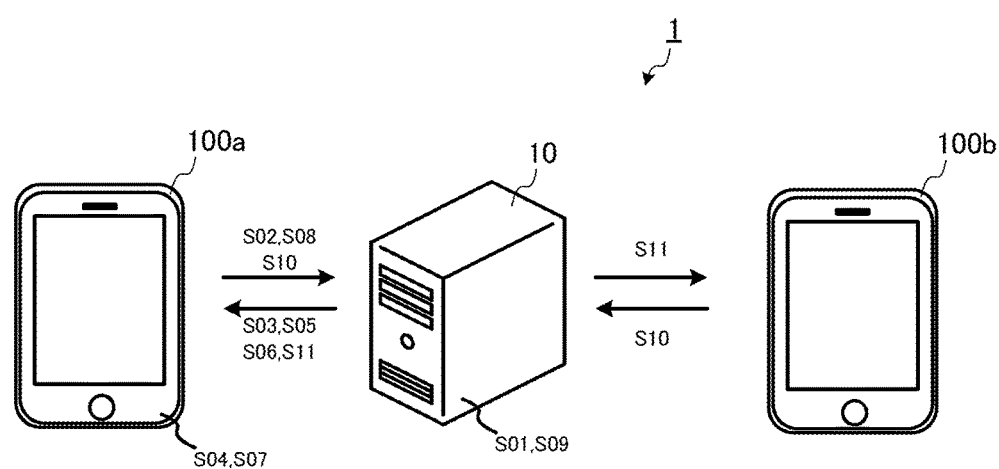
FIG. 1 shows a schematic diagram of the application providing system 1.

The overview of the present invention will be described below with reference to FIG. 1. The application providing system 1 includes an application providing server 10 and an application setting terminal 100a, 100b (hereinafter referred to as "application setting terminal 100" unless otherwise specified).

The application providing server 10 is communicatively connected with an application setting terminal 100, which transmits a predetermined application to the application setting terminal 100 in response to access from the application setting terminal 100.

The application providing server 10 has a data communication function, which is a general server performing data communication with an application setting terminal 100. The application providing server 10 also stores a policy table, a blacklist table, and a whitelist table to be described later.

The application setting terminal 100 has a data communication function, which is a home or office appliance performing data communication with the application providing server 10. Examples of the application setting terminal 100 include information appliances such as a mobile phone, a mobile information terminal, a personal computer, a net book terminal, a slate terminal, an electronic book terminal, and a portable music player.

First, in the application providing system 1, the application providing server 10 acquires and stores one ID associated with a plurality of application setting terminals 100 and a policy from a different terminal such as a management terminal communicatively connected with the application providing server 10 (step S01). In the step S01, the ID identifies one group consisting of a plurality of application setting terminals 100. Furthermore, the ID is associated with a plurality of application setting terminals 100, which identifies this plurality of application setting terminals 100. This ID is previously set in an application setting terminal 100.

The policy is a condition that the application providing server 10 restricts the provision of an application. For example, the policy is to restrict the provision of an application that accesses a web server accessible from URL addresses other than previously specified URL addresses.

One application setting terminal 100 may be associated with a plurality of IDs. Moreover, one ID may be associated with only one application setting terminal 100. Other conditions may be set for the policy. A plurality of policies may be set for one ID. One policy may be set for a plurality of IDs. The ID to be set in an application setting terminal 100 may be set directly by the user or by an external terminal, other servers, etc.

Then, the application setting terminal 100 transmits an acquisition request of an application to the application providing server 10 as an application acquisition request (step S02). In the step S02, the application acquisition request contains an ID to which an application setting terminal 100 belongs.

The application providing server 10 transmits application information to the application setting terminal 100 based on the application acquisition request (step S03). In the step S03, the application information contains information on an application such as the identifier, the name, the type, the content, and the icon of an application.

The application setting terminal 100 receives the application information transmitted from the application providing server 10, displays an application list based on this application information, and receives an operation of whether or not to install an application (step S04).

The application setting terminal 100 installs and uses an application that the application setting terminal 100 receives an operation to install, from the application providing server 10 (step S05).

Then, the application setting terminal 100 acquires a policy associated with an ID to which the application setting terminal 100 belongs, from the application providing server 10 (step S06). The application setting terminal 100 may acquire a policy before installing an application in the step S04.

The application setting terminal 100 judges whether or not the installed application behaves in conformance to the policy (step S07). In the step S07, if judging that the application behaves in conformance to the policy, the application setting terminal 100 judges that the application can be used and does not restrict the use. On the other hand, if judging that the application does not behave in conformance to the policy, the application setting terminal 100 notifies the application providing server 10 that the application does not behave in conformance to the policy (step S08). In addition, the application setting terminal 100 disables the use of this application and displays a notification to show that this application is disabled.

The application providing server 10 receives the notification transmitted from the application setting terminal 100 and stops transmitting the application related to this notification to another application setting terminal 100 associated with the ID to which the application setting terminal 100 that has transmitted this notification belongs (step S09).

Then, an application setting terminal 100 accesses the application providing server 10 to install the application (step S10).

The application providing server 10 excludes the application violating the policy associated with an ID to which the application setting terminal 100 that has just accessed to the application providing server 10 belongs and transmits application information on the application conformable to the policy associated with this ID to the application setting terminal 100 (step S11).

The application setting terminal 100 lists the application information transmitted from the application providing server 10 and receives an operation of whether or not to install an application.

Configuration System of Application Providing System 1

Figure 2:
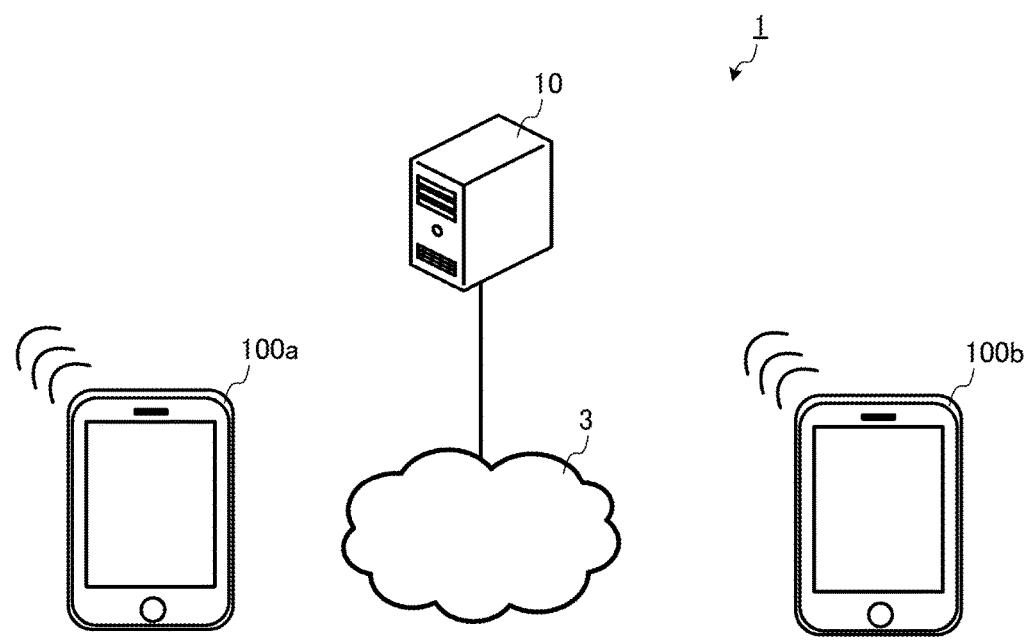
FIG. 2 shows an overall configuration diagram of the application providing system 1.

FIG. 2 is a system configuration diagram of the application providing system 1 that is a preferred embodiment of the present invention. The application providing system 1 includes an application providing server 10, an application setting terminal 100, and a public line network 300 (e.g. the Internet network, a third and a fourth generation networks).

The application providing server 10 has functions to be described later and a capability of data communication to provide an application to an application setting terminal 100.

The application setting terminal 100 has functions to be described later and a capability of data communication, to receive an application transmitted from the application providing server 10, display the list of the received application, and perform installation, etc., of this application. The application setting terminal 100 is a home or office appliance. Examples of the application setting terminal 100 include information appliances such as a mobile phone, a mobile information terminal, a net book terminal, a slate terminal, an electronic book terminal, and a portable music player.

Functions

Figure 3:
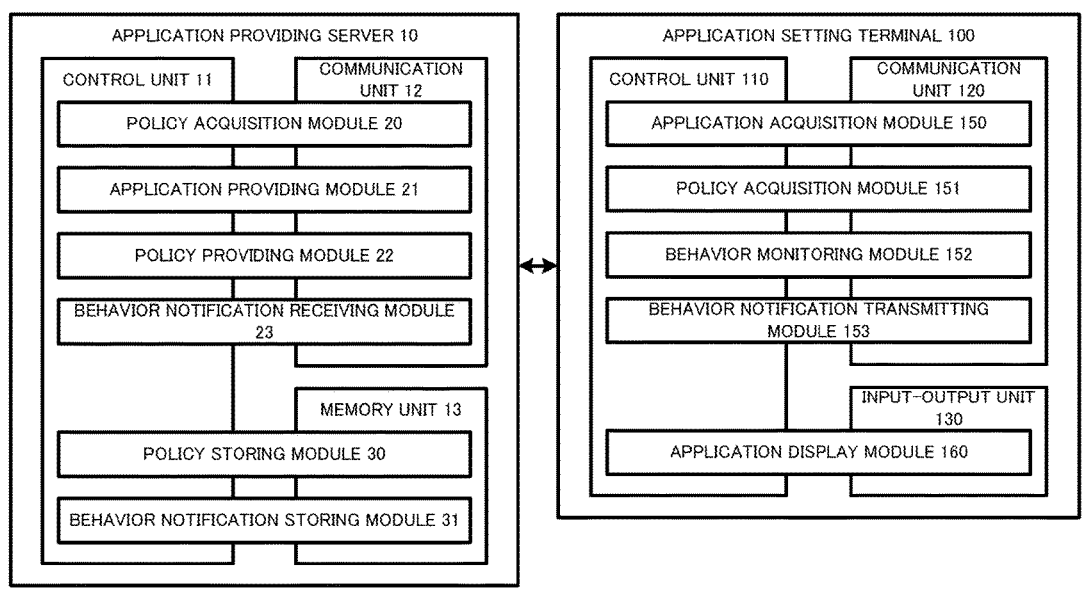
FIG. 3 shows a functional block diagram of the application providing server 10 and the application setting terminal 100.

The structure of each device will be described below with reference to FIG. 3.

The application providing server 10 includes a control unit 11 provided with a central processing unit (hereinafter referred to as "CPU"), a random access memory (hereinafter referred to as "RAM"), and a read only memory (hereinafter referred to as "ROM") and a communication unit 12 such as a device with capability of communicating with other devices, for example, a Wireless Fidelity or Wi-Fi® enabled device complying with IEEE 802.11. The application providing server 10 also includes a memory unit 13 such as a hard disk, a semiconductor memory, a record medium, or a memory card to store data. The memory unit 13 includes a policy table, a blacklist table, and a whitelist table to be described later.

In the application providing server 10, the control unit 11 reads a predetermined program to run a policy acquisition module 20, an application providing module 21, a policy providing module 22, and a behavior notification receiving module 23 in cooperation with the communication unit 12. Furthermore, in the application providing server 10, the control unit 11 reads a predetermined program to run a policy storing module 30 and a behavior notification storing module 31 in cooperation with the memory unit 13.

The application setting terminal 100 includes a control unit 110 provided with a CPU, a RAM, and a ROM; and a communication unit 120 such as a device with a capability of communicating with other devices, for example, a Wi-Fi® enabled device complying with IEEE 802.11 in the same way as the application providing server 10. The application setting terminal 100 also includes an input-output unit 130 including a display unit outputting and displaying data and images that have been processed by the control unit 110; and an input unit such as a touch panel, a keyboard, or a mouse that receives an input from a user. The application setting terminal 100 also includes a device capable of acquiring location information, such as a GPS.

In the application setting terminal 100, the control unit 110 reads a predetermined program to run an application acquisition module 150, a policy acquisition module 151, a behavior monitoring module 152, and a behavior notification transmitting module 153 in cooperation with the communication unit 120. Furthermore, in the application setting terminal 100, the control unit 110 reads a predetermined program to run an application display module 160 in cooperation with the input-output unit 130.

Application Providing Process

Figure 4:
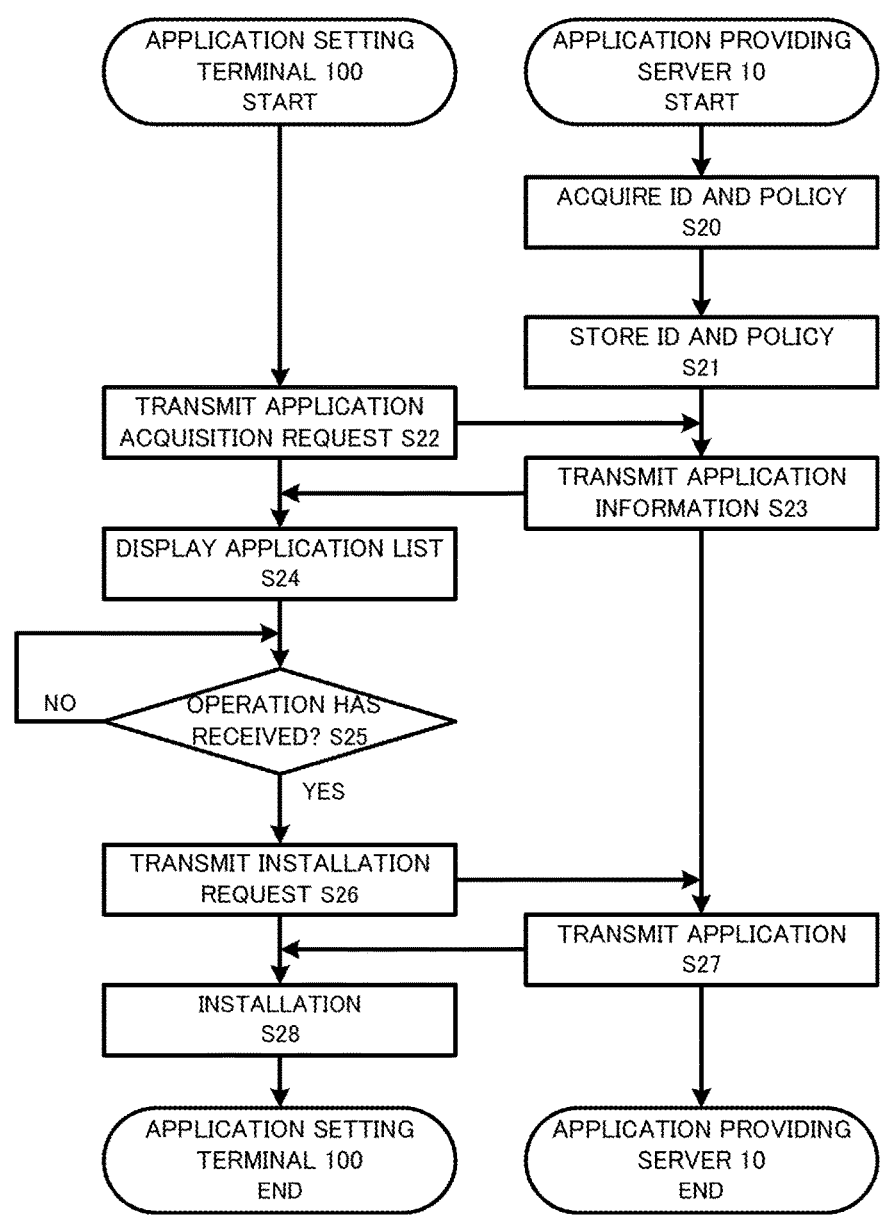
FIG. 4 shows a flow chart of the application providing process performed by the application providing server 10 and the application setting terminal 100.

FIG. 4 shows a flow chart of the application providing process performed by the application providing server 10 and the application setting terminal 100. The tasks executed by the modules of the above-mentioned devices are explained below together with this process.

First, the policy acquisition module 20 of the application providing server 10 acquires an ID and a policy associated with this ID (step S20). In the step S20, the ID is the identifier of one group consisting of a plurality of application setting terminals 100. Each ID is associated with a plurality of application setting terminals 100 making up one group. An ID to which the application setting terminal 100 belongs is previously set in an application setting terminal 100 itself. The policy relates to a security when the application providing server 10 provides an application, which is a condition that the application providing server 10 restricts the provision of an application to an application setting terminal 100. For example, the policy is to restrict the provision of an application that accesses a web server accessible from URL addresses other than previously specified URL addresses. The policy acquisition module 20 acquires the ID and the policy from another terminal such as a management terminal or an input terminal that is communicatively connected with the application providing server 1.

A plurality of IDs may be set to one application setting terminal 100. One ID may be set to one application setting terminal 100. Other conditions may be set for the policy. A plurality of policies may be set for one ID. One policy may be set for a plurality of IDs.

The policy storing module 30 of the application providing server 10 associates and stores the ID acquired by the policy acquisition module 20 with a policy in the policy table shown in FIG. 6 (step S21).

Policy Table

FIG. 6 shows a policy table stored by the policy storing module 30. In FIG. 6, the policy storing module 30 associates and stores an ID with a policy. In FIG. 6, the policy storing module 30 stores "XXXX" as an ID and "Access is denied to external servers other than specified external servers" as a policy associated with this ID. In the step S20, the policy stored by the policy storing module 30 specifically describes that access is denied from URLs other than previously specified URL addresses.

In this embodiment, one ID is associated with one policy but may be with a plurality of policies. Furthermore, a plurality of IDs may be associated with one policy. The content of an ID and a policy stored by the policy storing module 30 is one example and needless to say, may be changed as needed.

Then, the application acquisition module 150 of an application setting terminal 100 transmits an application acquisition request to the application providing server 10 as an acquisition request for an application (step S22). In the step S22, the application acquisition request transmitted from an application acquisition module 150 contains an ID to which the application setting terminal 100 belongs.

The application providing module 21 of the application providing server 10 receives the application acquisition request transmitted from the application setting terminal 100. The application providing module 21 transmits application information necessary for displaying the list of an available application on the application setting terminal 100, to the application setting terminal 100 (step S23). The application information contains information on an application such as the identifier, the name, the type, the content, and the icon of an available application.

Figure 9:
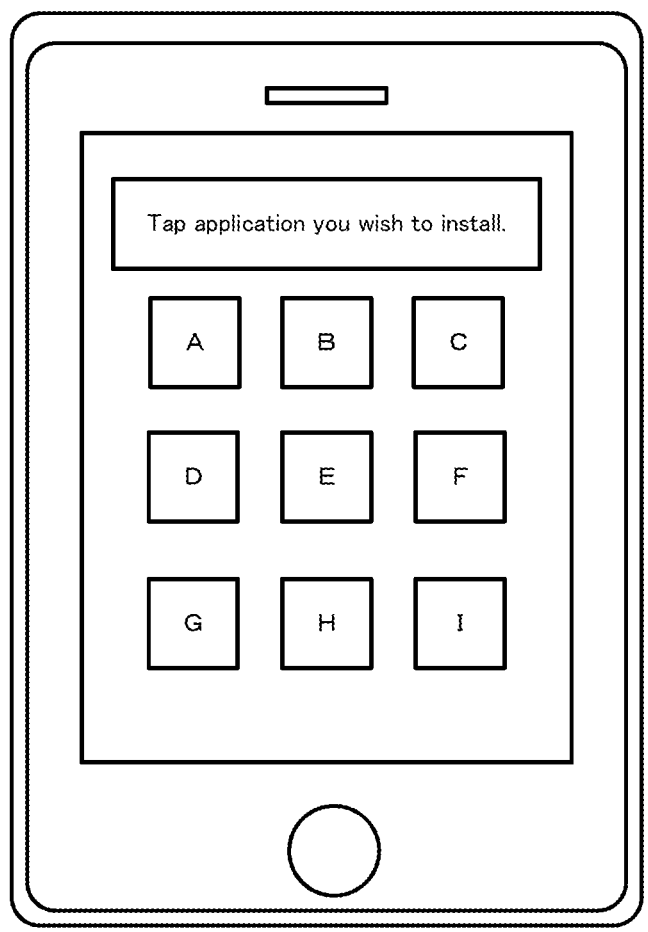
FIG. 9 shows an application list display screen displayed by the application setting terminal 100.

The application acquisition module 150 of the application setting terminal 100 receives the application information transmitted from the application providing server 10. The application display module 160 of the application setting terminal 100 displays the list of the application on the application list display screen shown in FIG. 9 based on the received application information (step S24). In FIG. 9, the application display module 160 displays a plurality of applications A to I on the application list display screen. The application display module 160 receives an operation of tap, input, etc., for each of the applications A to I. The number of applications displayed by the application display module 160 is not limited to the above-mentioned number and may be more or less than this number.

The application display module 160 of the application setting terminal 100 judges whether or not the application display module 160 has received an operation for an application (step S25).

In the step S25, if having not received an operation from the user, the application display module 160 judges that the application display module 160 has not received an operation for an application (NO) to repeat this process until receives an operation for an application.

On the other hand, if having received an operation from the user, the application display module 160 judges that the application display module 160 has received an operation for an application (YES) in the step S25, the application acquisition module 150 transmits an installation request for installing the application for which a selection operation is performed, to the application providing server 10 (step S26). This installation request contains application information.

The application providing module 21 of the application providing server 10 receives the installation request transmitted from the application setting terminal 100. The application providing module 21 specifies the application for which an operation is performed from the application setting terminal 100, based on application information contained in the installation request and transmits the specified application to the application setting terminal 100 (step S27).

The application acquisition module 150 of the application setting terminal 100 receives and installs the application transmitted from the application providing server 10 (step S28).

Application Display Restriction Process

Figure 5:
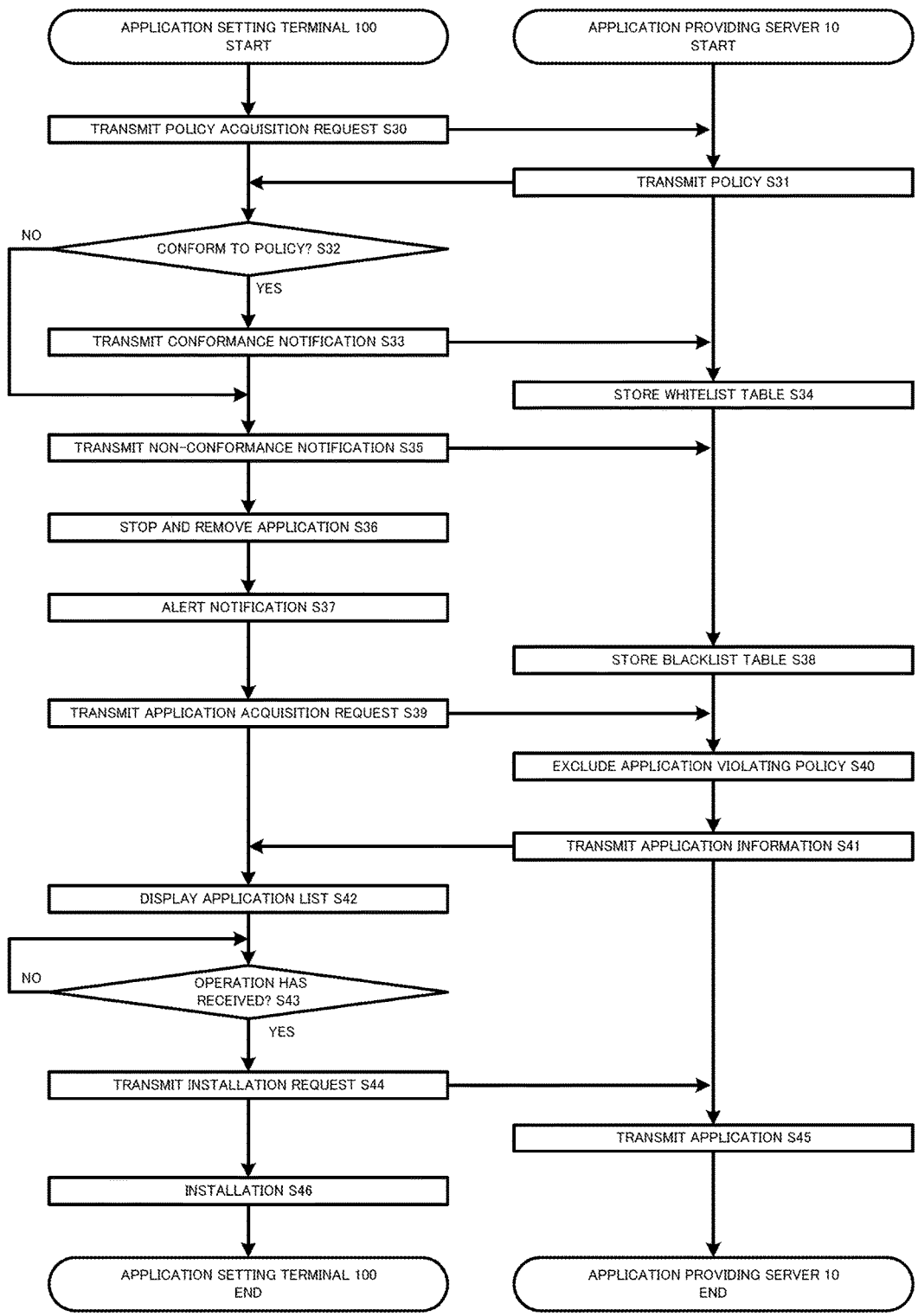
FIG. 5 shows a flow chart of the application display restriction process performed by the application providing server 10 and the application setting terminal 100.

FIG. 5 shows a flow chart of the application display restriction process performed by the application providing server 10 and the application setting terminal 100. The tasks executed by the modules of the above-mentioned devices are explained below together with this process. The application display restriction process is performed by the application setting terminal 100 while an application is running.

First, the policy acquisition module 151 of an application setting terminal 100 transmits a policy acquisition request to the application providing server 10 as a request for a policy (step S30). This policy acquisition request contains an ID to which the application setting terminal 100 belongs, to acquire a policy associated with this ID. The process of the step S30 may be performed not all the time but, for example, at certain intervals or a predetermined date and time.

The policy providing module 22 of the application providing server 10 receives the policy acquisition request transmitted from the application setting terminal 100. The policy providing module 22 transmits a policy associated with an ID contained in the received policy acquisition request to the application setting terminal 100 based on the policy table stored by the policy storing module 30 (step S31).

The policy acquisition module 151 of the application setting terminal 100 receives and acquires the policy transmitted from the application providing server 10. The behavior monitoring module 152 of the application setting terminal 100 judges whether or not each application installed in the application setting terminal 100 behaves in conformance to the acquired policy (step S32). In the step S32, the behavior monitoring module 152 monitors the communication situation of each application, the URL accessed from each application, the location information on the application setting terminal 100, whether or not each application behaves in conformance to the policy, and the like. In place of the policy acquisition module 151, a monitoring application may be acquired from the application providing server 10, other servers, etc., to monitor the behavior of other applications.

If the behavior monitoring module 152 judges that an application in current use behaves in conformance to the acquired policy (YES) in the step S32, the behavior notification transmitting module 153 of the application setting terminal 100 notifies the application providing server 10 of a conformance notification that this application behaves in conformance to the policy (step S33). The conformance notification contains application information and an ID to which the application setting terminal 100 belongs. The behavior monitoring module 152 judges that this application can be used and does not interrupt behavior such as start, operation, or communication of the application. After the behavior notification transmitting module 153 transmits a conformance notification, the behavior monitoring module 152 repeats the process of the above-mentioned step S32.

The behavior notification receiving module 23 of the application providing server 10 receives a conformance notification transmitted from the application setting terminal 100. The behavior notification storing module 31 of the application providing server 10 associates and stores an application contained in the received conformance notification and an ID to which the application setting terminal 100 that has transmitted the conformance notification belongs in the whitelist table shown in FIG. 7 (step S34).

Whitelist Table

FIG. 7 shows a whitelist table stored by the behavior notification storing module 31. In FIG. 7, the behavior notification storing module 31 associates and stores an application with an ID. In FIG. 7, the application is the name of an application, and the behavior notification storing module 31 stores the applications "B" and "C."

Moreover, the ID is an ID to which the application setting terminal 100 that has transmitted a conformance notification of this application belongs. The behavior notification storing module 31 stores the ID "XXXX" in FIG. 7. In FIG. 7, the behavior notification storing module 31 associates and stores the applications "B" and "C" with the ID "XXXX."

In FIG. 7, the ID stored by the behavior notification storing module 31 may be a different ID. Moreover, the application stored by the behavior notification storing module 31 may be a different item such as the identifier, the type, or the icon of an application. The numbers of the application and of the ID that are stored by the behavior notification storing module 31 are not limited to those shown in this embodiment.

The application providing server 10 may store the whitelist table based on the application information transmitted from an external terminal, etc. Specifically, the application providing server 10 may acquire an ID and a policy associated with this ID from an external terminal, judge that an application registered in this whitelist table is available even if violating a policy registered in the policy table, so as not to exclude the application registered in this whitelist table in the policy violation application exclusion process to be described later.

On the other hand, if the behavior monitoring module 152 judges that an application in current use does not behave in conformance to the acquired policy (NO) in the step S32, the behavior notification transmitting module 153 of the application setting terminal 100 notifies the application providing server 10 of a non-conformance notification that this application does not behave in conformance to the policy (step S35). The non-conformance notification contains application information and an ID to which the application setting terminal 100 belongs.

Then, the behavior monitoring module 152 of the application setting terminal 100 stops and removes the application not behaving in conformance to the policy (step S36). In the step S36, the behavior monitoring module 152 may merely stop the application.

Figure 10:
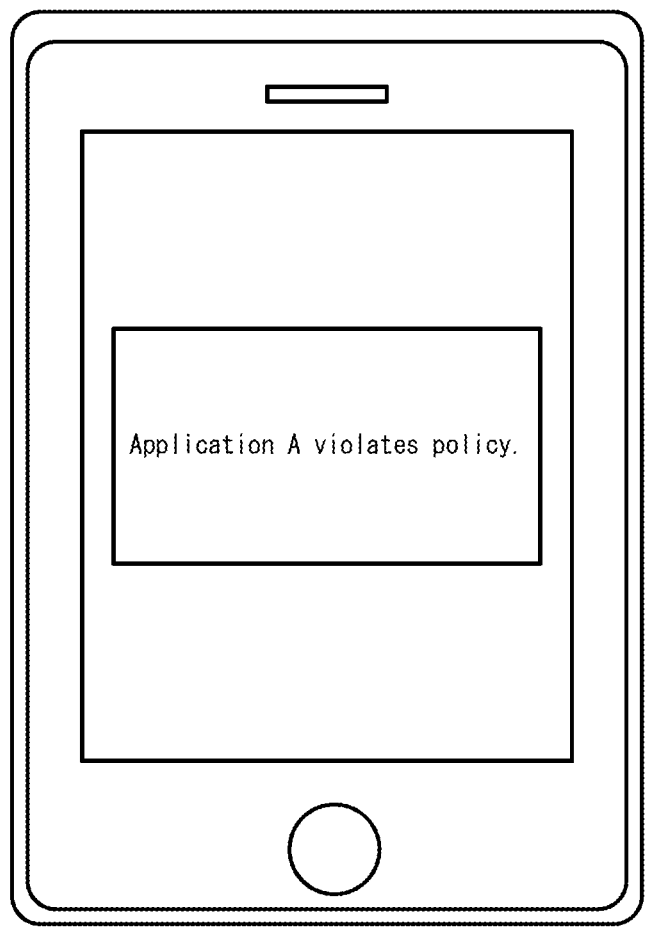
FIG. 10 shows an alert notification screen displayed by the application setting terminal 100.

The application display module 160 of the application setting terminal 100 displays the alert notification screen shown in FIG. 10 (step S37).

In FIG. 10, the application display module 160 of the application setting terminal 100 displays an alert notification that the behavior of the application A that violates a policy is detected, for example, "The application A violates a policy" The alert notification displayed by the application display module 160 may be a different content. The alert notification may be made by voice, vibration, or another notification method or in combination thereof.

The behavior notification receiving module 23 of the application providing server 10 receives the non-conformance notification transmitted from the application setting terminal 100. The behavior notification storing module 31 of the application providing server 10 associates and stores an application contained in the received non-conformance notification and an ID to which the application setting terminal 100 that has transmitted the non-conformance notification belongs in the blacklist table shown in FIG. 8 (step S38).

Blacklist Table

Figure 8:
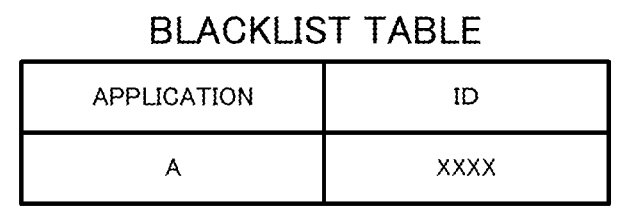

FIG. 8 shows a blacklist table stored by the behavior notification storing module 31. In FIG. 8, the behavior notification storing module 31 associates and stores an application with an ID. In FIG. 8, the application is the name of an application, and the behavior notification storing module 31 stores the application "A."

Moreover, the ID is an ID to which the application setting terminal 100 that has transmitted a non-conformance notification of this application belongs. The behavior notification storing module 31 stores the ID "XXXX" shown in FIG. 8. In FIG. 8, the behavior notification storing module 31 associates and stores the application "A" with the ID "XXXX."

In FIG. 8, the ID stored by the behavior notification storing module 31 may be a different ID. Moreover, the application stored by the behavior notification storing module 31 may be a different item such as the identifier, the type, or the icon of an application. The numbers of the application and of the ID that are stored by the behavior notification storing module 31 are not limited to those shown in FIG. 8.

Then, the application acquisition module 150 of the application setting terminal 100 transmits an application acquisition request to install an application (step S39). The step S39 is processed in the same way as the above-mentioned step S22.

The application providing module 21 of the application providing server 10 receives an application acquisition request transmitted from an application setting terminal 100. The application providing module 21 of the application providing server 10 looks up the blacklist table stored by the behavior notification storing module 31 based on an ID contained in the received application acquisition request and excludes an application associated with this ID from the application to be provided (step S40). For example, in the step S40, the application providing module 21 excludes the application "A" registered in the blacklist table from the application to be provided.

The application providing module 21 of the application providing server 10 transmits application information on an application other than an application excluded in the step S40 (step S41). For example, the application providing module 21 transmits application information on the applications "B" to "I" other than the excluded application "A" to the application setting terminal 100 in the step S41.

Figure 11:
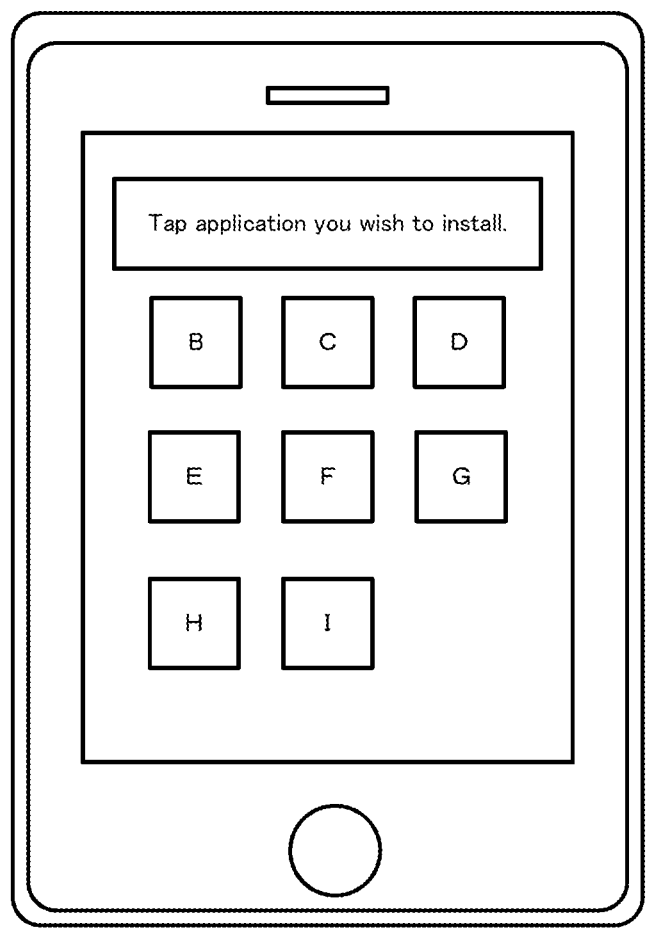
FIG. 11 shows an application list display screen displayed by the application setting terminal 100.

The application acquisition module 150 of the application setting terminal 100 receives the application information transmitted from the application providing server 10. The application display module 160 of the application setting terminal 100 displays the application list display screen shown in FIG. 11 based on the received application information (step S42). In FIG. 11, the application display module 160 displays a plurality of applications B to I on the application list display screen. Specifically, in the step S42, the application list display screen displayed by the application display module 160 displays the applications B to I other than the excluded application A not behaving in conformance to a policy associated with an ID to which the application setting terminal 100 belongs. The application display module 160 receives an operation of tap, input, etc., for each of the applications B to I. The number of applications displayed by the application display module 160 is not limited to the above-mentioned number and may be more or less than this number.

The application display module 160 of the application setting terminal 100 judges whether or not the application display module 160 has received an operation to an application (step S43). The step S43 is processed in the same way as the above-mentioned step S25.

In the step S43, if having not received an operation from the user, the application display module 160 judges that the application display module 160 has not received an operation for an application (NO) to repeat this process until receives an operation for an application.

On the other hand, if having received an operation from the user, the application display module 160 judges that the application display module 160 has received an operation for an application (YES) in the step S43, the application acquisition module 150 transmits an installation request for installing the application for which a selection operation is conducted, to the application providing server 10 (step S44). The step S44 is processed in the same way as the above-mentioned step S26.

The application providing module 21 of the application providing server 10 receives an installation request transmitted from an application setting terminal 100. The application providing module 21 specifies the application for which an operation is performed from the application setting terminal 100, based on application information contained in the installation request and transmits the specified application to the application setting terminal 100 (step S45). The step S45 is processed in the same way as the above-mentioned step S27.

The application acquisition module 150 of the application setting terminal 100 receives and installs the application transmitted from the application providing server 10 (step S46). The step S46 is processed in the same way as the above-mentioned step S28.

To achieve the means and the functions that are described above, a computer (including CPU, an information processor, and various terminals) reads and executes a predetermined program. For example, a program is provided in forms recorded in a computer-readable record medium such as a flexible disk, a CD (e.g., CD-ROM), or a DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

REFERENCE SIGNS LIST

1 Application providing system
10 Application providing server
100 Application setting terminal

What is claimed is:

1. An application providing server transmitting an application to an application setting terminal, comprising:
  a policy storing unit that previously stores a policy used to judge whether or not to provide each of a plurality of applications for each ID;
  an application providing display unit that, in response to access from an application setting terminal, displays only at least one application conformable to the policy associated with an ID of the application setting terminal among the plurality of applications, as at least one application transmittable to the application setting terminal;
  an application transmitting unit that transmits an application which is selected from the at least one displayed transmittable application by the application setting terminal to the application setting terminal; and
  an application excluding unit that, when the application setting terminal judges that the transmitted application violates the policy associated with the ID of the application setting terminal, excludes the transmitted application from the at least one transmittable application.

2. An application setting terminal communicatively connected with the application providing server according to claim 1, comprising:
  an application setting unit that receives and sets an application from the application providing server;
  a policy judgment unit that judges whether or not the set application behaves in conformance to the policy; and a notification unit that notifies the application providing server that the application is not conformed if the policy judgment unit judges that the set application does not behave in conformance to the policy.

3. The application setting terminal according to claim 2, wherein the policy judgment unit judges whether or not the set application behaves in conformance to the policy by detecting that the application accesses an outside server based on a policy whether or not the application accesses an outside server.

4. An application providing system comprising an application setting terminal and an application providing server, the application providing server being communicatively connected with the application setting terminal and transmitting an application to the application setting terminal, wherein the application providing server includes:
　a policy storing unit that previously stores a policy used to judge whether or not to provide each of a plurality of application for each ID;
　an application providing display unit that, in response to access from an application setting terminal, displays only at least one application conformable to the policy associated with an ID of the application setting terminal among the plurality of applications, as at least one application transmittable to the application setting terminal;
　an application transmitting unit that transmits an application which is selected from the at least one displayed transmittable application by the application setting terminal to the application setting terminal; and
　an application excluding unit that, when the application setting terminal judges that the transmitted application violates the policy associated with the ID of the application setting terminal, excludes the transmitted application from the at least one transmittable application, and the application setting terminal includes:
　an application setting unit that receives and sets an application from the application providing server;
　a policy judgment unit that judges whether or not the set application behaves in conformance to the policy; and
　a notification unit that notifies the application providing server that the application is not conformed if the policy judgment unit judges that the set application does not behave in conformance to the policy.

5. A method of transmitting an application to an application setting terminal, comprising:
　previously storing a policy used to judge whether or not to provide each of a plurality of applications for each ID;
　in response to access from an application setting terminal, displaying only at least one application conformable to the policy associated with an ID of the application setting terminal among the plurality of applications, as at least one application transmittable to the application setting terminal;
　transmitting an application which is selected from the at least one displayed transmittable application by the application setting terminal to the application setting terminal; and
　when the application setting terminal judges that the transmitted application violates the policy associated with the ID of the application setting terminal, excluding the transmitted application from the at least one transmittable application.

6. A computer program product for use in an application providing server transmitting an application to an application setting terminal, comprising a non-transitory computer usable medium having a set of instructions physically embodied therein, the set of instructions including computer readable program code, which when executed by the application providing server causes the information processing unit to:
　previously store a policy used to judge whether or not to provide each of a plurality of applications for each ID;
　in response to access from an application setting terminal, display only at least one application conformable to the policy associated with an ID of the application setting terminal among the plurality of applications, as at least one application transmittable to the application setting terminal;
　transmit an application which is selected from the at least one displayed transmittable application by the application setting terminal to the application setting terminal; and
　when the application setting terminal judges that the transmitted application violates the policy associated with the ID of the application setting terminal, exclude the transmitted application from the at least one transmittable application.

* * * * *